(12) United States Patent
Nikander et al.

(10) Patent No.: US 11,697,574 B2
(45) Date of Patent: Jul. 11, 2023

(54) ELEVATOR

(71) Applicant: Kone Corporation, Helsinki (FI)

(72) Inventors: Juhamatti Nikander, Helsinki (FI); Arto Nakari, Helsinki (FI)

(73) Assignee: Kone Corporation, Helsinki (FI)

( * ) Notice: Subject to any disclaimer, the term of this patent is extended or adjusted under 35 U.S.C. 154(b) by 979 days.

(21) Appl. No.: 16/451,267

(22) Filed: Jun. 25, 2019

(65) Prior Publication Data

US 2020/0071127 A1     Mar. 5, 2020

(30) Foreign Application Priority Data

Aug. 30, 2018   (EP) ..................... 18191634

(51) Int. Cl.
  *H02H 3/20*   (2006.01)
  *H02H 3/44*   (2006.01)
  (Continued)

(52) U.S. Cl.
  CPC ................ *B66B 5/028* (2013.01); *B66B 1/30* (2013.01); *B66B 5/0031* (2013.01);
  (Continued)

(58) Field of Classification Search
  CPC .................................. H02P 27/06; H02P 9/30
  See application file for complete search history.

(56) References Cited

U.S. PATENT DOCUMENTS 5,847,533 A      12/1998  Hakala et al.
6,163,472 A  *   12/2000  Colby ................... H02M 7/797
                                                     363/44

(Continued)

FOREIGN PATENT DOCUMENTS

EP   3165491 A1   5/2017
EP   3300203 A1   3/2018
(Continued)

OTHER PUBLICATIONS

European Search Report with Application No. 18191634.7 dated Feb. 19, 2019.

*Primary Examiner* — Kawing Chan
*Assistant Examiner* — Charles S Laughlin
(74) *Attorney, Agent, or Firm* — Harness, Dickey & Pierce, P.L.C.

(57) ABSTRACT

The invention relates to an elevator comprising at least one elevator car moved by at least one elevator motor, which elevator motor is driven by a frequency converter controlled by a control device of the elevator, the frequency converter comprising a rectifier bridge, an inverter bridge and a DC link connected in-between, the inverter bridge being connected to the elevator motor and the rectifier bridge being connected to AC mains via three phase supply lines comprising an LCL-filter and a mains switch. The elevator further comprises a backup power supply and a safety device of the control device, which in case of a mains power failure is configured to switch off the mains switch and to connect the backup power supply to the DC link and/or to at least one phase supply line, whereby the rectifier bridge is a bidirectional rectifier bridge being configured to convert DC supplied to the DC link from the backup power supply to an AC voltage supplied to at least two of the phase supply lines connected with at least one load circuit. An earth fault protection circuit for the load circuit is connected between earth and a common terminal of the capacitors of the LCL filter for monitoring an earth fault indicating signal, and which earth fault protection circuit is configured to issue an earth fault signal and/or initiating earth fault safety measures, dependent on the earth fault indicating signal.

15 Claims, 2 Drawing Sheets

Figure 1:
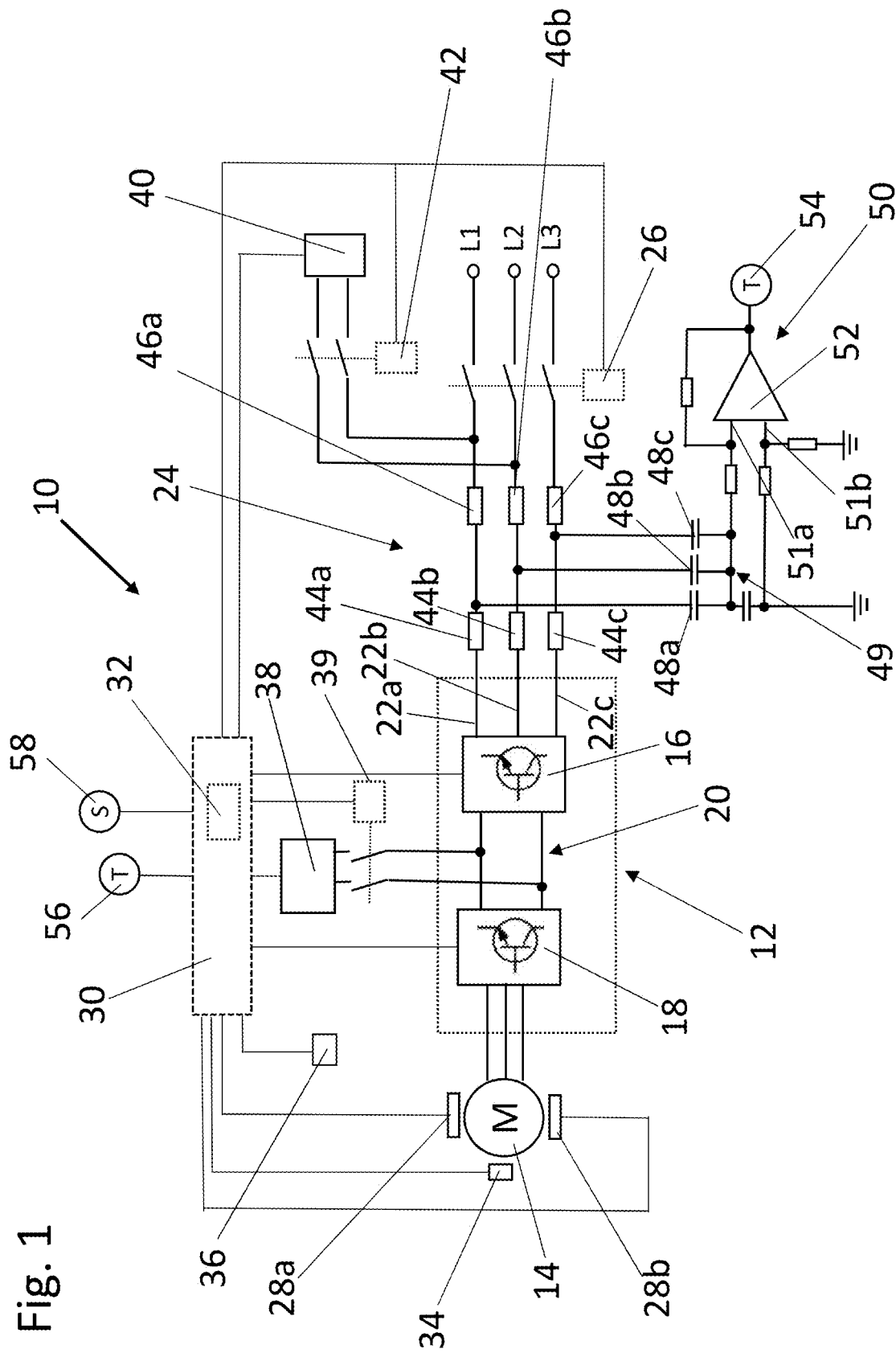

(51) Int. Cl.
  *B66B 5/02* (2006.01)
  *B66B 1/30* (2006.01)
  *B66B 5/00* (2006.01)
  *H02H 1/00* (2006.01)
  *H02H 7/09* (2006.01)
  *H02H 7/12* (2006.01)
  *H02P 3/06* (2006.01)

(52) U.S. Cl.
  CPC ............ *H02H 1/0007* (2013.01); *H02H 7/09* (2013.01); *H02H 7/1216* (2013.01); *H02P 3/06* (2013.01)

(56) References Cited

U.S. PATENT DOCUMENTS

| | | | | |
|---|---|---|---|---|
| 2003/0052544 | A1* | 3/2003 | Yamamoto | H02M 5/271 307/66 |
| 2012/0261217 | A1* | 10/2012 | Agirman | B66B 1/302 187/290 |
| 2015/0054443 | A1* | 2/2015 | Swamy | H02P 23/06 318/504 |

FOREIGN PATENT DOCUMENTS

| | | | |
|---|---|---|---|
| JP | 2014114107 | A | 6/2014 |
| WO | WO-8809584 | A1 | 12/1988 |

\* cited by examiner

ELEVATOR

This application claims priority to European Patent Application No. 18191634.7, filed on Aug. 30, 2018, the entire contents of which are incorporated herein by reference.

The present invention relates to an elevator comprising at least one elevator car moved by at least one elevator motor, which elevator motor is driven by a frequency converter controlled by a control device of the elevator. The frequency converter comprises a rectifier bridge, an inverter bridge and a DC link connected in-between, whereby the inverter bridge is connected to the elevator motor and the rectifier bridge is connected to AC mains via three phase supply lines comprising an LCL filter and a mains switch. The elevator further comprises a backup power supply and a safety device of the control device, which in case of a mains power failure is configured to switch off the mains switch and to connect the backup power supply to the DC link and/or to at least one phase supply line. The rectifier bridge is a bidirectional rectifier bridge being configured to convert DC supplied to the DC link from the backup power supply to an AC voltage supplied to at least two of the phase supply lines, to which at least one load circuit, for example a door operator for the elevator car door and/or lightning and/or ventilation or other loads is/are connected.

It is object of the present invention to provide an elevator which easily deals with earth faults happening in connection with the load circuits connected to the at least two phase supply lines which are supplied by the rectifier bridge in case of mains power off.

The object of the invention is solved with an elevator according to claim 1 as well as with a method according to claim 10. Preferred embodiments of the invention are subject-matter of the corresponding dependent claims. Preferred embodiments of the invention are also described in the specification as well as in the drawings.

According to a preferred embodiment of the invention, an earth fault protection circuit for the at least one load circuit is connected between earth and a common terminal of the capacitors of the LCL filter for monitoring an earth fault indicating signal. The earth fault protection circuit is configured to output an earth fault signal to the safety device and/or to initiate earth fault safety measures if receiving an earth fault indicating signal at its input.

Preferably on this behalf the earth fault protection circuit may comprise a comparator which is configured to compare the earth fault indicating signal with a threshold value, whereby it is configured to issue an earth fault signal and/or to initiate earth fault safety measures, when the earth fault indicating signal exceeds the threshold value, which also might be a very low value.

Via this quite simple and low cost earth fault protection circuit, an earth fault can be detected in the load circuit without necessitating a galvanically isolated transformer as it has been used up to now in the load circuit. As the costs of a galvanically isolated transformer are comparably high, the invention solves the problem of providing an earth fault protection for the load circuit in a very easy and economical way. In a preferred embodiment of the invention, the mains switch is operated by the safety device of the elevator which safety device also connects or disconnects the backup power supply to/from the DC link. Via this measure, the safety device can in a case of a blackout immediately disconnect the phase supply lines from the public AC network and can supply DC via the backup power supply to the DC link and/or to at least one phase supply line which makes it possible to drive the elevator car and to release the elevator brakes to drive the elevator car to a nearby landing in travelling direction as well as to provide at least two of the phase supply lines with an AC via the rectifier bridge reversely operated, so that at least one load circuit can be supplied with AC in case of mains power off. Of course, all three supply lines could be supplied with AC via the reversed operated rectifier bridge to supply a three-phase load.

The backup power supply may be connected only to the DC link. However, preferably the backup power supply might be connected in parallel with a series-connected rectifier bridge and first impedance of the phase supply line. Hence, the negative terminal of the backup power supply is connected to the DC link and its positive terminal is connected to the phase supply line, so that the negative terminal is all the time connected to the negative branch of the DC link and the positive terminal is connectable with a controllable switch to one phase supply line of the mains. Particularly in this case the positive terminal is connected such that an inductor is between the rectifier bridge and the connection point of the positive terminal. Hence, the series-connected inductor and rectifier bridge may be used as a boost converter to boost backup battery voltage to the DC link voltage level. The load is in this case connected to the other two phase supply lines. Hence, the rectifier bridge may boost a backup battery supply while simultaneously converting the DC link voltage into AC for the load connected with the at least two supply lines.

In a preferred embodiment of the invention, the output of the earth fault protection circuit is connected to an input of the safety device of the elevator, preferably in a galvanically isolated way, for example via an opto-coupler or via wireless transmission. Via this feature, the presence of an earth fault in a load circuit connected to at least two of the phase supply lines is immediately indicated to the safety device. The presence of an earth fault in a load circuit is not a severe problem so that it is preferable that a current elevator ride can be completed by the safety device before the elevator is put out of service.

On this behalf, preferably, a position sensor for the elevator car is connected to the safety device so that the safety device is able to determine whether or not the elevator car is running or standing in a door zone of the elevator. This has the advantage that the safety device can put the elevator out of service if on one hand, the earth fault signal is present and on the other hand, the position sensor indicates that the elevator car is standing in a door zone of the elevator. In this case, the safety device may de-energize the elevator brakes so that the brakes grip the brake pads co-acting with the rotor of the elevator motor or with the traction sheave and additionally the elevator motor is de-energized by switching off the semiconductor switches of the inverter bridge. Additionally, in case the elevator comprises contactors between the inverter and the motor, the contactors could be opened. This function can easily be realised with an AND operator linking the position sensor signal with respect to door zone and the earth fault signal from the earth fault protection circuit.

Via these measures, a currently running car ride can be completed but on the other hand a new start of the elevator is prevented so that maintenance can be performed after all passengers have been released from the running car.

Preferably, the load circuit is connected to the phase supply lines without the intermediation of a galvanically isolating transformer. The invention allows the direct connection of the load circuit to the phase supply lines of course preferably via an interrupting switch which is controlled by the safety device and which connects the load circuit to the phase supply lines only in case the mains switch is switched off and the phase supply lines are supplied with alternating current from the rectifier bridge. In normal operation of the elevator, the interrupting switch is open which is necessary as in normal operation the voltage between two phase supply lines is about 400 V AC.

Preferably, the earth fault indicating signal between the common terminal of the capacitors of the LCL filter and earth is a current or voltage signal.

In a preferred embodiment, the earth fault protection circuit comprises an op-amplifier (OP-AMP) whose inputs are connected to earth as well as to the common terminal of the LCL capacitors. With this arrangement, also small currents or small voltages are sufficient to provide a clear earth fault signal which is then transferred to the safety device.

Instead of using an Op-amplifier, the earth fault indication signal could be detected with any other voltage or current measurement/detection solution/method across common terminals of capacitors of the LCL filter and earth.

In a preferred embodiment of the invention, the safety device is connected to the control device and the control device is configured upon receipt of the earth fault from the safety device to drive the car in travelling direction to the next door zone and then to de-activate the elevator. Via this measure, it is ensured that the passengers driving in the car could be released before the elevator is taken out of service because of the earth fault in the load circuit. This function could be designated as safe ride function.

The invention also relates to a method for operating an elevator in case of a mains power failure, in which method an elevator according to the above-mentioned type is used. According to the invention, an earth fault protection is provided by monitoring an earth fault indicating signal between earth and a common terminal of the capacitors of at least two phases of the LCL filter and by issuing an earth fault signal and/or initiating earth fault safety measures when the earth fault indicating signal exceeds a threshold value. As it has already been mentioned above in connection with the inventive elevator, an earth fault protection in one or several load circuits can be established without having a galvanically isolating transformer between the phase supply lines and the load circuit. Preferably, the safety measures comprise a drive of the elevator car to the next door zone in travelling direction. Alternatively it could also travel to the light direction of the unbalanced system (elevator car and the counterweight).
 travel to the nearest floor.
 travel to the destination floor of prevailing ride.
 complete all of the rides allocated to it (if there is for example 3 people traveling to different floors, the elevator could take them to these floors but not accept new travels.).

Furthermore, the safety measures preferably comprise the de-activation of the elevator car after the car has stopped or stands in a door zone of the elevator.

In a preferred embodiment of the invention, the safety measures comprise the indicating of a load circuit earth fault to a maintenance remote centre which enables immediate maintenance of the elevator.

All the above-mentioned measures ensure that the elevator car is safely moved to a nearby door zone and the passengers riding in the car can be released. Preferably, the safety device may initiate the control device to issue an acoustic and/or optical indication to the passengers in the elevator car that the car is put out of service and that the passengers should leave the car.

It is clear for the skilled person that the above-mentioned features of the invention may be combined arbitrarily with each other.

It is further clear for the skilled person that single components mentioned in the claims may be provided single-fold or multi-fold. Furthermore, the safety device may be part of the control device, e.g. integrated with the control device or may be a separated part connected to it. The connection between the earth fault detection circuit and the safety device may be arranged via an opto-coupler, via wireless transmission or via wire-bound transmission, e.g. via a car cable.

It is obvious for the invention to work that the rectifier bridge has to be a controlled bidirectional rectifier bridge comprising semiconductor switches as transistors or thyristors.

Following terms are used as a synonym: door zone—landing zone; earth—ground;

The invention is now described via a preferred schematic example in connection with the enclosed drawing.

Figure 2:
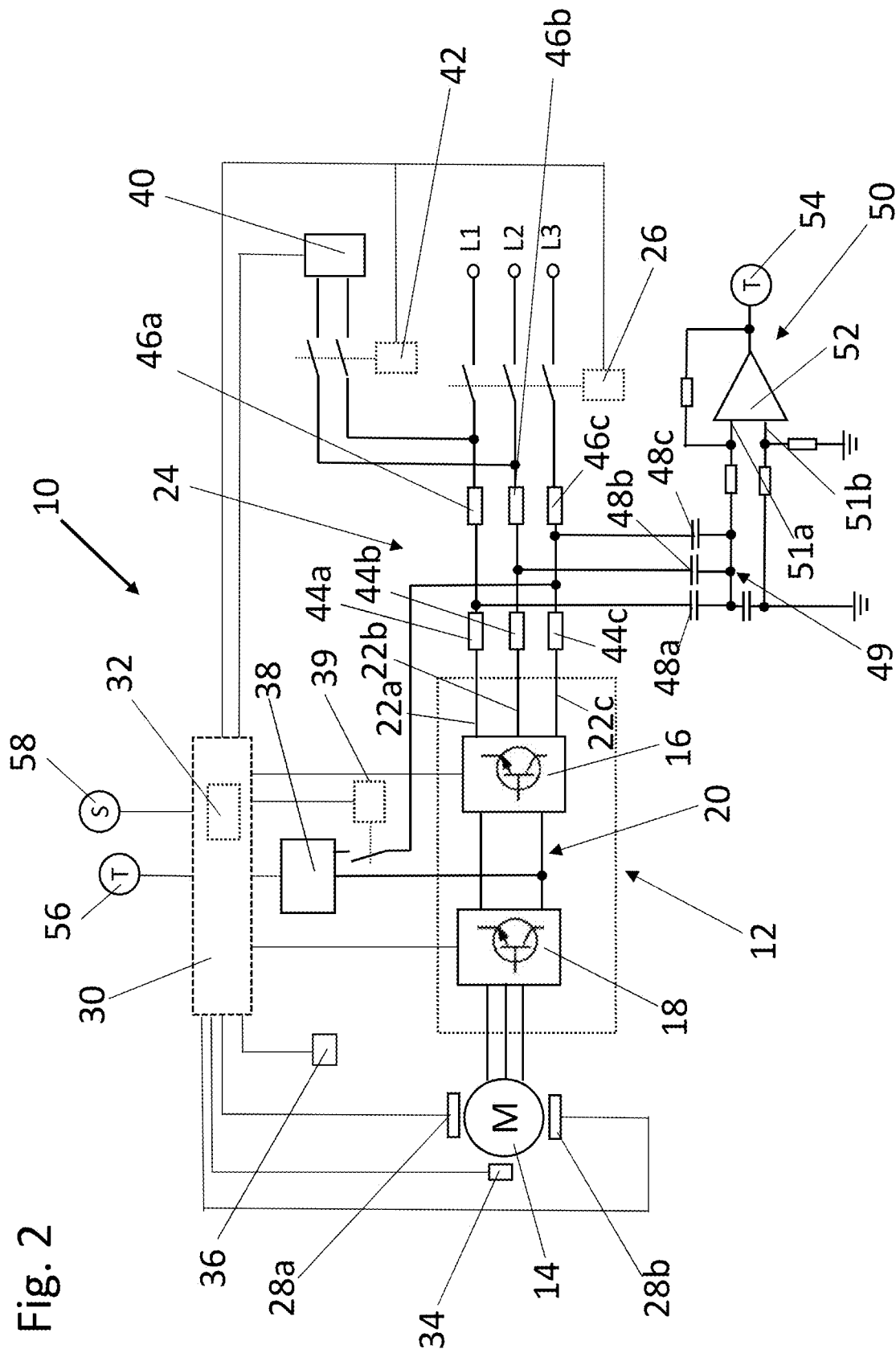

FIG. 1 shows a schematic diagram of a first embodiment of an elevator in connection with the earth fault protection for the motor drive of an elevator, whereby the backup power supply is connected with the DC link, and FIG. 2 shows a schematic diagram of a second embodiment of an elevator in connection with the earth fault protection for the motor drive of an elevator, whereby the backup power supply is connected with the DC link and with a supply line.

FIG. 1 shows the electric and electronic parts of an elevator 10 comprising a frequency converter 12 driving an elevator motor 14. The frequency converter 12 comprises a rectifier bridge 16, an inverter bridge 18 and a DC link 20 located in between. The inverter bridge 18 is connected to the motor 14 and the rectifier bridge 16 is connected to three phase supply lines 22a, 22b, 22c which comprise an LCL filter 24 as well as a mains switch 26 and are connected with the AC phases L1, L2, L3 of a public AC electricity network.

The elevator motor 14 comprises two elevator brakes 28a, 28b which are controlled by a control device 30 of the elevator 10 having an integrated safety device 32 which may also be separate from the control device. The control device 30 is connected with a tachometer 34 enabling the control device 30 to obtain a signal regarding the speed of the elevator motor as well as with a position sensor 36 informing the control device and of course the safety device 32 of the position of the elevator car in the shaft, or whether the car has reached a door zone (door zone sensor). The control device 30 controls the inverter bridge 18 as well as the rectifier bridge 16 via control lines. The control device 30 also controls a backup power supply 38 which preferably comprises a battery and/or a supercapacitor or the like. Also the backup power supply 38 is controlled by the control device 30 or by the safety device 32, respectively. At least one load circuit 40, for example any kind of elevator electrification and/or preferably a door operator of the elevator car, is connected to two of the phase supply lines 22a, 22b via an interruption switch 42 which is controlled by the safety device 32. Also the mains switch 26 is controlled by the safety device 32.

The LCL filter 24 comprises first and second impedances 44a-c, 46a-c, e.g. coils as well as capacitors 48a-c which have a common terminal 49 which is connected to a first input 51a of an op-amplifier 52 which are forming parts of an earth fault detection circuit 50. The second input 51b is connected to earth. The output of the op-amplifier is connected to a transmission node 54 which may be an opto-coupler, a wireless transmitter or a cable, whereby the corresponding receiving part to the transmission node 54 is a receiver node 56 connected with the control device or the safety device 32, respectively. The control device 30 is also connected with a safety chain 58 so that the control device 30 of the elevator 10 also gets other safety-related information from the motor, from the elevator shaft, from the landing doors and the car doors and from all other safety-relevant parts of the elevator.

The elevator works as follows: In case of a mains power off, the safety device 32 immediately controls the mains switch 26 to open and the interruption switch 42 to close and simultaneously it controls the backup power supply 38 to be connected with the DC link 20 via a connecting switch 39. Simultaneously, the rectifier bridge 16 is controlled to produce an alternating current, preferably 230 V AC, in two phase supply lines 22a, 22b to which also the at least one load circuit 40 is connected via the now closed interruption switch 42. Via this solution, the load circuit, for example the door operator of the elevator car, can still be kept working so that the car doors may be opened when the elevator car reaches a landing. The earth fault protection circuit 50 is provided to detect an earth fault in the arrangement of the load circuit 40 and is coupled thereto via its first input terminal 51a and the common terminal 49 of the capacitors 48a-c of the LCL circuit 24. The other input terminal 51b is connected to earth. On this behalf, an earth fault indication signal between the op-amplifier inputs 51a and 51b of the earth fault detection circuit 50 is monitored and if there is an earth fault in the load circuit 40, this leads to a signal between the two input terminals 51a, 51b of the op-amplifier 52. The output of the op-amplifier 52 is connected to the transmission node 54 which informs the safety device 32 as well as the control device 30 that an earth fault is present in the load circuit 40. The safety device 32 is then able to take the necessary measures to bring the elevator to a safe stop as an earth fault in the load circuit is not a severe fault. Preferably, in this case, the safety device 32 indicates the earth fault to the control device which then controls the elevator motor to drive the elevator car to the next landing door in the current driving direction whereby the car speed is monitored via the tachometer 34 and the arrival of the elevator car at landing zone or door zone is monitored via the position sensor 36. After the car has arrived the door zone, the control device 30 stops the motor and de-energizes the brakes 28 with the energy of the backup power supply 38 which is connected to the DC link 20. In this connection it is to be mentioned that preferably also the brake drive for the elevator brakes 28a and 28b is connected to the DC link. Thus, with the present invention, an economical solution is provided for handling earth faults in at least one load circuit in a mains power off situation of the elevator.

In FIG. 1 the backup power supply is connected only to the DC link. The embodiment of FIG. 2 is nearly identical to FIG. 1 so that identical or functionally similar components are designated with the same reference numbers. In FIG. 2—in contrast to the embodiment of FIG. 1—the backup power supply is connected in parallel with the series-connected rectifier bridge 16 and the first impedance 44a,b,c of the phase supply line 22a,b,c. Hence, the negative terminal of the backup power supply 38 is connected to the DC link 20 and its positive terminal is connected to one of the phase supply lines 22a, 22b or 22c, so that the negative terminal is all the time connected to the negative branch of the DC link and the positive terminal is connectable with a controllable switch to one phase supply line 22a, 22b, 22c of the mains L1, L2, L3. Particularly in this case the positive terminal is connected such that an a first impedance 44a, 44b, 44c is connected between the rectifier bridge 16 and the connection point of the positive terminal to the phase supply line 22a, 22b, 22c. Hence, the series-connected impedance 44a, 44b, 44c and rectifier bridge 16 may be used as a boost converter to boost backup battery voltage to the DC link voltage level. The load is in this case connected to the other two phase supply lines 22a, 22b, 22c. Hence, the rectifier bridge 16 may boost a backup battery supply 36 while simultaneously converting the DC link voltage into AC for the load connected with the at least two supply lines 22a, 22b, 22c.

It is clear for the skilled person that the invention is not restricted to the disclosed embodiment but that the invention may deviate within the scope of the appended patent claims.

LIST OF REFERENCE NUMBERS 10 elevator
12 frequency converter
14 elevator motor
16 rectifier bridge
18 inverter bridge
20 DC link
22a,b,c phase supply lines
24 LCL filter
26 mains switch—contactor relay
28a,b elevator brakes
30 control device
32 safety device
34 tachometer—speed sensor
36 position sensor of the elevator car
38 backup power supply
40 load circuit (door circuit, lightning, ventilation etc.)
42 interruption switch
44a,b,c first impedances of the LCL filter—first coils
46a,b,c second impedances of the LCL filter—second coils
48a,b,c capacitors of the LCL filter
49 common terminal of the capacitors of the LCL filter
50 earth fault detection circuit
51a,b input terminals of the op-amplifier
52 op-amplifier
54 transmission node
56 receiver node
58 safety chain—safety circuit of the elevator

The invention claimed is:

1. An elevator comprising:
an elevator car;
an elevator motor;
a backup power supply;
a load circuit;
a frequency converter, configured to drive the elevator motor, the frequency converter including a rectifier bridge, an inverter bridge and a DC link electrically connecting the rectifier bridge and the inverter bridge to each other, wherein
the DC link is connected between the rectifier bridge and the inverter bridge,
the inverter bridge connected to the elevator motor,
the rectifier bridge connected to an AC mains via three phase supply lines, the three phase supply lines including an LCL filter and a mains switch, the LCL filter including a plurality of first impedances, a plurality of second impedances, and a plurality of capacitors that are each connected between a separate pair of first and second impedances of the pluralities of first and second impedances, the rectifier bridge is a bidirectional rectifier bridge that is configured to convert DC power that is supplied to the DC link from the backup power supply to AC power that is supplied to at least two phase supply lines of the three phase supply lines, and the load circuit configured to be connected to the at least two phase supply lines between the second impedances of the LCL filter and the mains switch;

a control device configured to control the frequency converter, the control device including a safety device, the safety device configured to, in response to a mains power failure, open the mains switch, and close a connecting switch to connect the backup power supply to the DC link and/or at least one of the phase supply lines; and an earth fault protection circuit connected between an earth and a common terminal of the plurality of capacitors of the LCL filter, wherein the earth fault protection circuit and the load circuit are configured to be connected in parallel with the rectifier bridge based on the main switch being opened and the connecting switch being closed, the earth fault protection circuit configured to detect an indication of an earth fault in the load circuit based on monitoring an earth fault indicating signal, the earth fault protection circuit configured to issue an earth fault signal and/or initiate an earth fault safety measures in response to detecting the indication of the earth fault in the load circuit.

2. The elevator according to claim 1, wherein the safety device connects the backup power supply to the DC link.

3. The elevator according to claim 1, wherein the backup power supply is connected in parallel with the rectifier bridge and an impedance of one phase supply line of the three phase supply lines, such that a negative terminal of the backup power supply is connected to the DC link, and a positive terminal of the backup power supply is connected to the one phase supply line.

4. The elevator according to claim 2, wherein an output of the earth fault protection circuit is connected to an input of the safety device of the elevator.

5. The elevator according to claim 1, further comprising a position sensor for the elevator car, the position sensor connected to the safety device.

6. The elevator according to claim 1, wherein the load circuit is connected to the three phase supply lines without intermediation of any galvanically isolating transformer.

7. The elevator according to claim 1, wherein the load circuit is connected to the at least two phase supply lines via an interrupting switch controlled by the safety device.

8. The elevator according to claim 1, wherein the earth fault indicating signal is a current or voltage signal.

9. The elevator according to claim 1, wherein the earth fault protection circuit comprises an op-amplifier, the op-amplifier having a first input and a second input, the first input connected to the common terminal of the plurality of capacitors of the LCL filter, the second input connected to the earth.

10. The elevator according to claim 1, wherein the safety device is connected to the control device, and the control device is configured to, in response to receiving the earth fault signal, drive the elevator car in a travelling direction to a next door zone, and de-activate the elevator after the elevator car has stopped or stands in the next door zone.

11. The elevator according to claim 1, wherein the earth fault protection circuit comprises a comparator, the comparator configured to compare the earth fault indicating signal with a threshold value, and issue the earth fault signal in response to a determination that the earth fault indicating signal exceeds the threshold value.

12. A method for operating the elevator of claim 1, the method comprising:

in response to a mains power failure, opening the mains switch, and closing the connecting switch to connect the backup power supply to the DC link and/or at least one of the phase supply lines, such that the load circuit is configured to receive power from the backup power supply, and further such that the earth fault protection circuit and the load circuit are connected in parallel with the rectifier bridge;

monitoring, at the earth fault protection circuit, the earth fault indicating signal;

detecting, at the earth fault protection circuit, the indication of the earth fault in the load circuit based on the monitoring the earth fault indicating signal; and issuing the earth fault signal and/or initiating the earth fault safety measures, in response to detecting the indication of the earth fault in the load circuit.

13. The method according to claim 12, wherein the earth fault safety measures comprise driving the elevator car to a next door zone in a traveling direction.

14. The method according to claim 12, wherein the earth fault safety measures comprise de-activation of the elevator car after the elevator car has stopped or stands in a next door zone.

15. The method according to claim 12, wherein the earth fault safety measures comprise indicating the earth fault in the load circuit to a maintenance remote centre.

\* \* \* \* \*